(No Model.) 2 Sheets—Sheet 1.
E. CLEMENT.
MECHANICAL MOVEMENT.
No. 350,479. Patented Oct. 12, 1886.
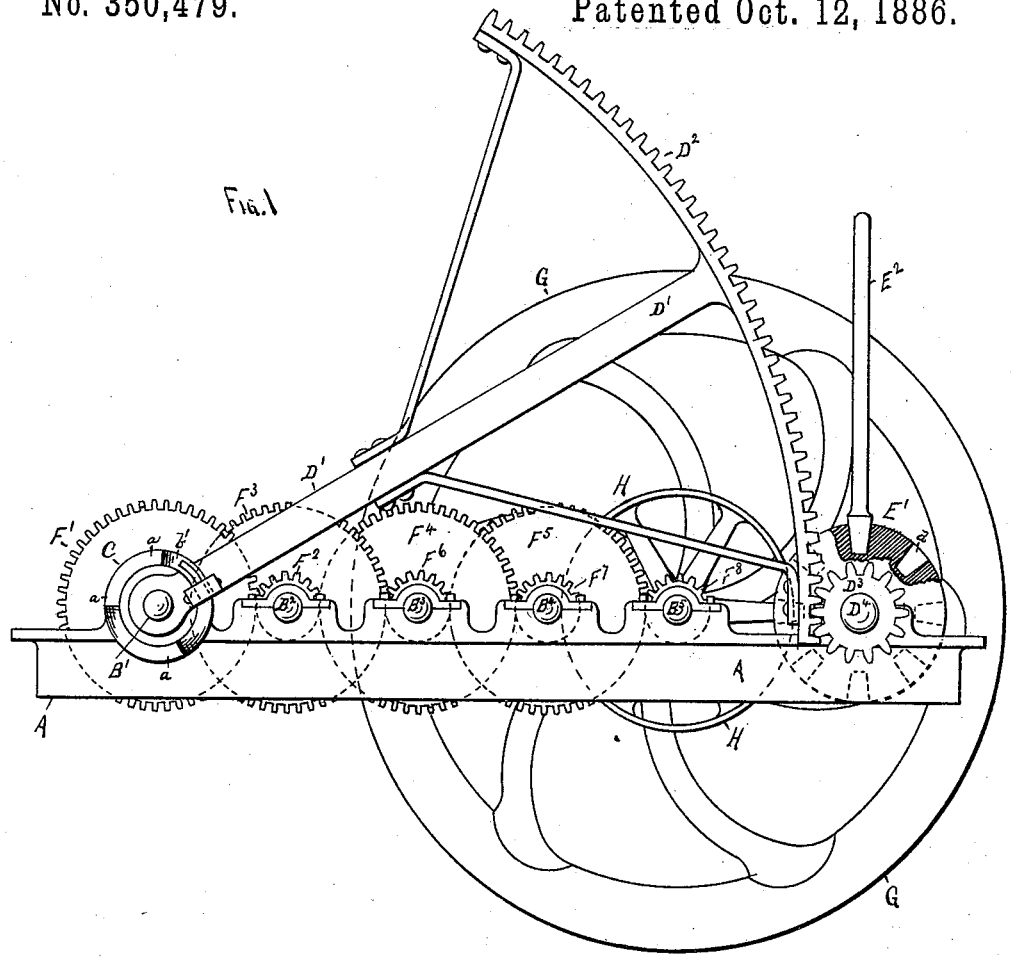
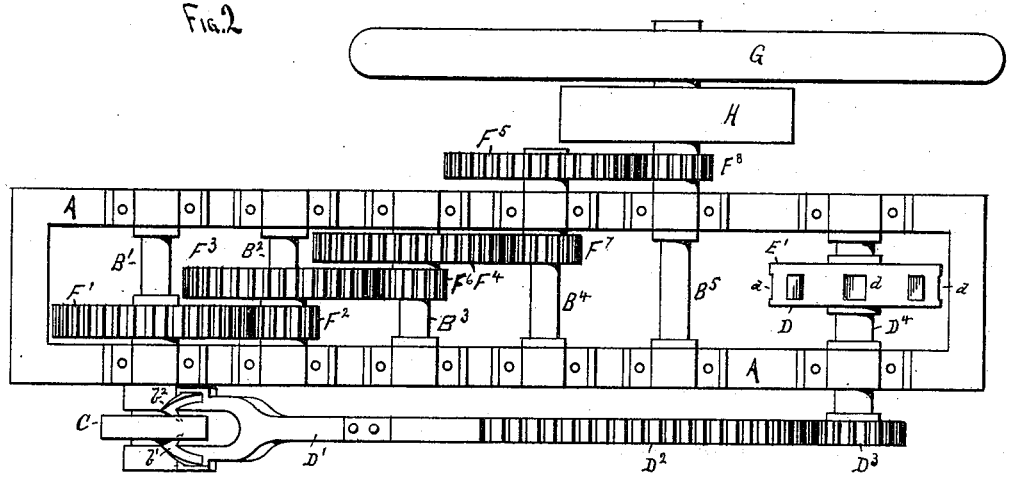
WITNESSES.
C. N. Woodward
Louis Feeser Jr.
Engel Clement.
INVENTOR. BY
Louis Feeser & Co. Attys.

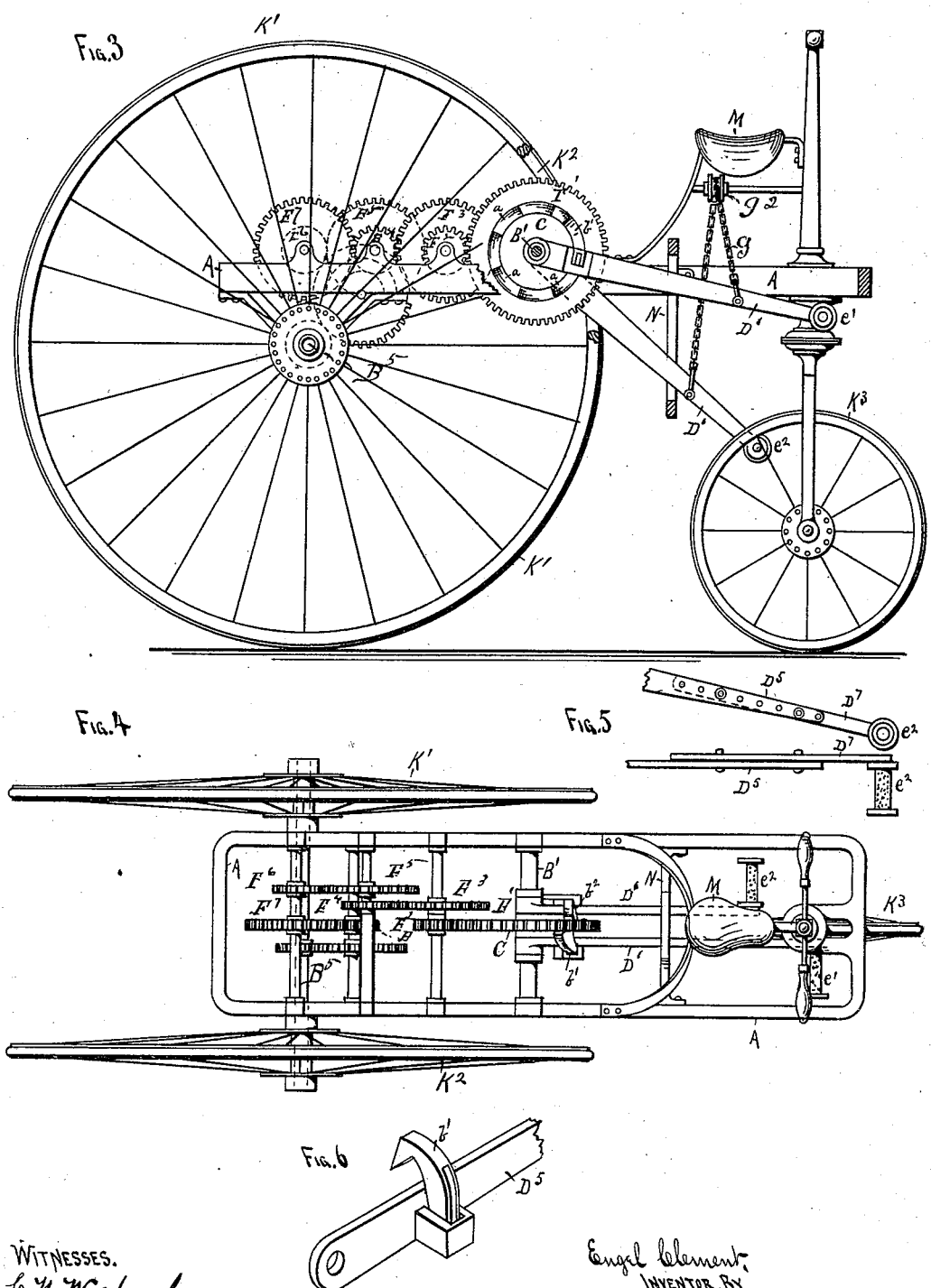

UNITED STATES PATENT OFFICE.

ENGEL CLEMENT, OF ST. PAUL, MINNESOTA, ASSIGNOR OF ONE-HALF TO PETER RECKINGER, OF SAME PLACE.

MECHANICAL MOVEMENT.

SPECIFICATION forming part of Letters Patent No. 350,479, dated October 12, 1886.

Application filed January 12, 1886. Serial No. 188,326. (No model.)

*To all whom it may concern:*

Be it known that I, ENGEL CLEMENT, a subject of the Emperor of Germany, and a resident of St. Paul, in the county of Ramsey and State of Minnesota, have invented certain new and useful Improvements in Mechanical Movements, of which the following specification is a full, clear, and exact description, reference being also had to the accompanying drawings.

This invention relates to mechanism for producing motion; and it consists in the construction, combination, and arrangement of parts as hereinafter shown and described, and then sought to be specifically defined by the claim.

In the drawings, Figure 1 is a side elevation, and Fig. 2 is a plan view, of one method of applying the invention to produce a rapid rotary motion. Fig. 3 is a side elevation, partially in section, and Fig. 4 is a plan view, of a modification of the device, showing the manner of applying it to a vehicle. Fig. 5 are detached details of a portion of the treadles, illustrating the manner of lengthening them. Fig. 6 is an enlarged detail view in perspective of the pawl and ratchet mechanism, whereby the reciprocal motion is changed into a rotary motion.

A is the frame-work, which may be formed in any desired manner to correspond to the purpose for which the "movement" is to be used.

In the drawings I have shown the invention applied to two separate machines, the modifications necessary to thus change the mode of application being very slight, and not affecting the functions, and producing substantially the same results.

In Figs. 1 and 2, B' represents a main shaft on which is secured a disk, C, having ratchet-teeth $a\,a$ formed in both sides equidistant and in a circle concentric to the shaft.

D' is a lever forked at one end embracing the ratchet-toothed disk C, and provided with spring-pawls $b'\,b^2$, adapted to catch in the teeth $a$ when the lever D' is moved in one direction, and slip over the teeth when the lever is moved in the opposite direction. By this construction it will be readily seen that the disk C may be revolved intermittently by the oscillation of the lever D'. The free end of the lever D' is provided with a geared segment, $D^2$, adapted to be engaged by a pinion, $D^3$, on a shaft, $D^4$, journaled across the frame A, as shown.

E' is a drum on the shaft $D^4$, having sockets $d$ in its periphery, in which a lever, $E^2$, will be inserted to revolve the shaft $D^4$, and thus through the pinion $D^3$ and segment $D^2$ oscillate the lever D'.

F' is a gear on the shaft B', adapted to engage with a pinion, $F^2$, on a shaft, $B^2$, journaled across the frame A; and $F^3$, $F^4$, and $F^5$ are three other gears on shafts $B^2$, $B^3$, and $B^4$, adapted to engage with pinions $F^6$ $F^7$ $F^8$ on shafts $B^3$ $B^4$ $B^5$, the whole forming a train of gears and pinions by which the rotary motion of the shaft B' is transmitted to the shaft $B^5$ at a greatly accelerated speed.

On the shaft $B^5$ is shown a balance-wheel, G, by which the speed may be regulated and the uniformity of the motion insured. A band-wheel, H, is also shown on the same shaft, from which the power may be transmitted for any desired purpose. By using a long lever, D', and a small pinion, $D^3$, and a long lever, $E^2$, a very powerful compound leverage power is secured which may be transmitted through a long train of gears, and thus secure a very high speed with the expenditure of a small amount of power on the lever $E^2$.

In Figs. 3 and 4 I have shown substantially the same mechanism applied to a vehicle of the tricycle pattern. In this modification the lever is divided into two parts, D' D', and each part pivoted upon the main shaft B' on opposite sides of the disk C, and each part provided with its own pawl $b'\,b^2$. The teeth $a$ in this modification are arranged alternately on opposite sides of the disks, so that while one part D' of the lever is moving downward and with its pawl $b'$ acting upon the teeth $a$ on one side of the disk C, the other part D' will be moving upward to be re-engaged with the disk. The train of gears and pinions are substantially the same in this modification as in the other, the last shaft, $B^5$, being the axle to which the main drive-wheels $K'\,K^2$ are attached. These main driving-wheels take the place of and serve the same purpose as a fly-wheel as the large wheel G in Figs. 1 and 2. In this modification a seat, M, and swiveled guide-wheel $K^3$ are provided, and the ends of the levers D' D' are provided with treadles $e'$ $e^2$ for the feet of the operator, who sits upon the seat M. The parts D' D' of the lever are connected by a chain, $g'$, passing over a pulley, $g^2$, so that the pushing of one part of the lever down will pull the other part upward, and vice versa.

N represents a guide-plate embracing the levers D' D', to prevent side movement.

In Fig. 5 I have shown one of the levers D' D' with an extension end, $D^7$, whereby its length may be increased to increase the leverage.

Having described my invention and set forth its merits, what I claim is—

The combination of the driving-shaft B', disk C, secured to the said shaft, and provided with ratchet-teeth $a\ a$, oscillating lever or levers D', pivoted on the said shaft, and provided with pawls $b'\ b^2$, adapted to engage with the said ratchet-teeth, means for oscillating the said lever or levers, motion-receiving shaft $B^5$, having a wheel or wheels thereon, and a train of gearing connecting the said shafts B' $B^5$, substantially as and for the purpose herein specified.

In testimony whereof I have hereunto set my hand in presence of two subscribing witnesses.

ENGEL CLEMENT.

Witnesses:
LOUIS FEESER, Jr.,
W. J. RODGERS.